United States Patent
Mayolle et al.

(10) Patent No.: US 9,604,719 B2
(45) Date of Patent: Mar. 28, 2017

(54) METHOD AND DEVICE FOR LATERAL CONTROL OF A TAXIING AIRCRAFT

(71) Applicant: AIRBUS OPERATIONS S.A.S., Toulouse (FR)

(72) Inventors: Matthieu Mayolle, Tournefeuille (FR); Caroline Acanfora, Blagnac (FR); Louis-Emmanuel Romana, Colomiers (FR); Julien Fontan, Toulouse (FR)

(73) Assignee: AIRBUS OPERATIONS S.A.S., Toulouse (FR)

(*) Notice: Subject to any disclaimer, the term of this patent is extended or adjusted under 35 U.S.C. 154(b) by 152 days.

(21) Appl. No.: 14/167,095

(22) Filed: Jan. 29, 2014

(65) Prior Publication Data

US 2014/0209739 A1 Jul. 31, 2014

(30) Foreign Application Priority Data

Jan. 30, 2013 (FR) ...................... 13 50771

(51) Int. Cl.
*B64C 25/48* (2006.01)
*B60T 8/17* (2006.01)
*B64C 25/50* (2006.01)

(52) U.S. Cl.
CPC ............ *B64C 25/48* (2013.01); *B60T 8/1703* (2013.01); *B64C 25/50* (2013.01); *B60T 2201/16* (2013.01)

(58) Field of Classification Search
CPC ......... B64C 25/50; B64C 25/26; B64C 25/48; B64C 25/42; B64C 25/44; B60T 8/1703
See application file for complete search history.

(56) References Cited

U.S. PATENT DOCUMENTS

| | | | |
|---|---|---|---|
| 5,845,975 A * | 12/1998 | Wells | B60T 7/16 188/382 |
| 7,865,289 B2 * | 1/2011 | Dellac | B60T 8/1703 244/111 |
| 8,538,604 B2 * | 9/2013 | Thibault | B60T 8/1703 244/111 |
| 2003/0125848 A1 * | 7/2003 | Otake | B64C 25/48 701/3 |

(Continued)

OTHER PUBLICATIONS

K. Haroon, "Wheel Brakes Application in 737-300" in The Airpine Pilots Forum and Resources, posted Feb. 22, 2008; http://www.theairlinepilots.com/forum/viewtopic.php?t=149&sid=baca7ff43ad1f4f9f1da51520075138b; accessed Mar. 7, 2016.*

(Continued)

*Primary Examiner* — Tien Dinh
*Assistant Examiner* — Alexander V Giczy
(74) *Attorney, Agent, or Firm* — Lorenz & Kopf, LLP (57) ABSTRACT

A device for lateral control of an aircraft includes a calculating unit for automatically applying, if conditions for turning of the aircraft are met, a symmetrical braking value at a brake assembly. Subsequently, in the course of the turn, the device automatically distributes this symmetrical braking value in differential braking between a braking device of the left main landing gear and a braking device of the right main landing gear of the aircraft. Distribution of the symmetrical breaking is performed as a function of current directional command orders in such a way as to maintain a constant overall braking level for, at least for directional command orders below a predetermined threshold.

14 Claims, 3 Drawing Sheets

(56) References Cited

U.S. PATENT DOCUMENTS

| | | |
|---|---|---|
| 2006/0186267 A1 | 8/2006 | Steiner et al. |
| 2008/0197239 A1 | 8/2008 | Bellouard et al. |
| 2010/0276988 A1* | 11/2010 | Cahill .................. B60T 8/1703 303/20 |
| 2011/0004376 A1 | 1/2011 | Chatrenet et al. |
| 2011/0153176 A1* | 6/2011 | Cahill .................... B60T 8/325 701/70 |
| 2013/0245907 A1* | 9/2013 | McKay ................ B60T 8/1703 701/71 |

OTHER PUBLICATIONS

French Patent Office, French Search Report for 1350771 Mailed Sep. 19, 2013.

\* cited by examiner

METHOD AND DEVICE FOR LATERAL CONTROL OF A TAXIING AIRCRAFT

CROSS-REFERENCE TO RELATED APPLICATION

This application claims priority to French Patent Application No. 1350771, filed Jan. 30, 2013, which is incorporated herein by reference in its entirety.

TECHNICAL FIELD

The technical field relates to a method and device for lateral control of a taxiing aircraft, in particular at an airport.

BACKGROUND

The embodiments of the present invention apply to the taxiing of an aircraft, in particular a civil or military aeroplane for transporting passengers or cargo (freight), or also a drone. It relates more particularly to the generation of a yawing moment (about the vertical axis of the aircraft) enabling the lateral control of the taxiing aircraft.

In the context of the embodiments of the present invention, taxiing is understood to mean any type of movement on the ground which is possible for an aircraft, such as movement on a landing runway during landing and takeoff phases, or movement on taxiways or on manoeuvring areas, in particular. Currently, the pilot controls the lateral movements of the aircraft on the ground with the aid of manual control elements (for example a handwheel enabling the orientation of the front landing gear wheel, a joystick for controlling the thrust of the engines, brake pedals, a rudder), along a course on the ground. These control elements enable control of actuators of the aircraft capable of influencing the lateral movements of the aircraft, essentially with the orientation of the nose wheel (and optionally the orientation of the tail gears) and the tail fin rudder, and more rarely, via an asymmetrical use of the engines and brakes.

Within the context of the embodiments of the present invention, a front wheel is understood to mean a mechanical assembly being provided with at least one wheel which is situated at the front of the aircraft, which preferably forms part of a front landing gear of the aircraft, and which can be oriented so as to be able to move the aircraft laterally when the aircraft is taxiing. In the event of breakdown of the orientation system of the nose wheel, at low speed, the aircraft can no longer be controlled laterally with the aid of the usual control elements for controlling the trajectory. In this case, generally, the system of orientation is deactivated and the nose wheel is free to rotate ("free to castor" mode).

In order to remedy this problem of control, the document FR-2 929 019 discloses a device which makes it possible to control the aircraft on the ground according to the lateral axis in such a situation by automatically applying a differential (or asymmetrical) braking in order to generate a yawing moment, in response to a control command on the usual steering control elements. To this end this document FR-2 929 019 provides an emergency BSF function ("backup steering function") for directional control, which is such that the behaviour of the aircraft is as close as possible to that obtained in normal conditions, when the system of orientation of the nose wheel is available.

The application of such differential braking, which therefore makes it possible to generate a yawing moment in the event of breakdown of the system of orientation of the nose wheel, nevertheless results in a loss of speed of the aircraft.

As this loss of speed is higher than that usually obtained when the normal steering system is available, it may make the control more delicate. The pilot should, in fact, adapt the thrust to the braking applied by the BSF function upon initiation, but likewise during turning or when exiting the turn. Moreover, once the turn is established, slight corrections by the pilot on the control elements may result in a braking and therefore variable deceleration.

If the thrust applied by the pilot in the turn is not adapted to counter the variation in speed generated by the BSF function, there is a risk of the aircraft stopping or of the turn being effected at too great a speed. In the case of stopping, the nose wheel may reach a substantial turning angle, or in rare cases may even touch its mechanical stop, which may result in maintenance actions, associated in particular with the risk of damage to the orientation system of the nose wheel. In addition, if the aircraft stops with a substantial turning angle of the nose wheel or even at the edge of the runway, restarting may be quite difficult.

On the other hand, if the management of the thrust results in an overspeed, the performance produced by the braking may be limited relative to the requirement. Furthermore, once the turn is effected, the pilot will have to reduce the thrust, so that once the aircraft is in a straight line, when the BSF function no longer applies braking, the aircraft retains an operational speed.

The difficulty associated with the control of the speed during the use of the BSF function also resides in the fact that the response time of the engines close to the idle speed is long, compared to the effect of the braking which is much more dynamic. The task of pilot control with a view to maintaining the speed may then become delicate because of this difference in dynamics between the braking and the engine thrust. Thus the BSF function, which therefore makes it possible to implement the lateral control of the aircraft in the event of breakdown of the nose wheel orientation system, is capable of generating variations in speed.

In view of the foregoing, at least one object is to remedy this drawback. In addition, other objects, desirable features and characteristics will become apparent from the subsequent summary and detailed description, and the appended claims, taken in conjunction with the accompanying drawings and this background.

SUMMARY

A method is provided for lateral control of an aircraft, in particular a taxiing civil or military transport aeroplane. The aircraft is provided with an orientable nose wheel and an emergency automatic asymmetrical (or differential) braking function. The method makes it possible to minimise the lateral/longitudinal coupling (namely to minimise the variations in speed of the aircraft) when asymmetrical braking is carried out in order to control the yawing moment of the aircraft in the event of breakdown of the nose wheel orientation system. To this end, the method is of the type which, in the event of breakdown of the nose wheel orientation system, implements emergency automatic asymmetrical braking, comprises at least the steps of: a) receiving command orders relating to the command of the orientation of said nose wheel; b) on the basis of the command orders, automatically determining braking orders for a brake assembly of the aircraft, which comprises a braking device of at least one left main landing gear and a braking device of at least one right main landing gear and which is capable of generating a lateral movement of the aircraft about a vertical axis with an asymmetrical action, said braking orders determined in such a way as to generate on the aircraft, when they are applied to the brake assembly, a lateral movement which is substantially identical to the lateral movement which would have been generated by the application of said command orders to said nose wheel; and c) automatically applying said braking orders to said brake assembly, and is remarkable in that it also comprises sub-steps of step b) including: b1) automatically verifying, in the event of activation of the emergency automatic asymmetrical braking, whether conditions for turning of the aircraft are met; and b2) if these conditions for turning of the aircraft are met and so long as they are, automatically applying a braking value, known as a symmetrical braking value, at the level of said brake assembly, then in the course of the turn automatically distributing this symmetrical braking value in differential braking between the braking device of the left main landing gear and the braking device of the right main landing gear, as a function of current directional command orders, in such a way as to maintain a constant overall braking level, at least for directional command orders below a predetermined threshold. Advantageously, when the turning conditions are met, the symmetrical braking value is applied progressively.

Thus, by the distribution during a turn of the symmetrical braking value representing a braking reserve, the method makes it possible to maintain a constant overall braking level, during the activation of an emergency automatic asymmetrical braking (BSF function). This is the case for the directional command orders below a predetermined threshold. In fact, the method does not cover all ranges of order of the pilot, since this would result in the implementation of an excessive braking reserve which would produce an over-consumption of fuel and a rapid increase in the temperature of the brakes.

More precisely, when the pilot commands directional orders with the aid of his control elements, part of the braking reserve (calculated as a function of the order commanded) is released on one side (of the brake assembly) in order to be added on the other side. For small orders from the pilot, this distribution makes it possible to maintain the same overall level of braking and thus facilitates the task of maintaining the speed of the aircraft. In fact, once the pilot has compensated for this overall level of braking by application of thrust, the speed of the aircraft remains constant, even in the case of application of small directional orders by the pilot. Therefore the method makes it possible not to affect the speed of the aircraft when a BSF function is active.

The embodiments can be implemented on any type of brakes (or of braking device), and in particular on electrical brakes, to which said braking orders are applied. An embodiment is implemented on usual brakes to which pressure is applied. In this case, in an advantageous manner, the symmetrical braking value is generated in the form of a pressure (braking) value, known as symmetrical pressure, which depends upon characteristics of the aircraft. Advantageously, this symmetrical pressure is defined such that the associated asymmetrical braking reserve covers, during an established turn, the resistive moment of the landing gears of the aircraft, as well as the orders of the pilot below a predetermined threshold in order to adjust the trajectory.

More precisely, in one advantageous manner, this symmetrical pressure is combined with a commanded pressure value, known as a commanded pressure, representing said directional command orders, in order to form a high pressure and a low pressure, of which one is applied to the braking device of the left landing gear and the other to the braking device of the right landing gear, as a function of the direction relative to said directional command orders.

Preferably, the high pressure Ph and the low pressure Pb are calculated on the basis of the symmetrical pressure Ps and of the commanded pressure Pc (asymmetrical pressure value), with the aid of the following expressions:

if $Pc=0, Ph=Pb=Ps$;

if $Pc<2*Ps, Ph=Ps+Pc/2$ and $Pb=Ps-Pc/2$; and if $Pc\geq 2*Ps, Ph=Pc$ and $Pb=0$.

Furthermore, in an advantageous manner, the conditions of turning are considered as met when the following conditions are simultaneously met: the emergency automatic asymmetrical braking (BSF function) is activated; the ground speed of the aircraft is lower than a predetermined speed; and a directional command order is higher than a threshold value. Moreover, advantageously, when the previously met turning conditions are no longer met, the symmetrical braking value is still maintained for a predetermined duration, and then it is progressively cancelled.

Furthermore, in an embodiment said symmetrical braking value, representing an asymmetrical braking reserve, can be combined with a thrust reserve, and said thrust reserve is applied to a usual mode of propulsion, preferably the engines, of the aircraft, during turning of said aircraft in such a way as to obtain an effect similar to that of the distribution of the braking reserve, thus creating a doubling of the capacity for generation of a yawing movement of the aircraft with a beneficial impact on the temperature and the fuel consumption.

A device is also provided for lateral control of an aircraft, in particular a taxiing transport aeroplane, said aircraft being equipped with an orientable nose wheel provided with an orientation system. Said device is of the type which, at least for implementing emergency automatic asymmetrical braking in the event of breakdown of the nose wheel orientation system, comprises: device for receiving command orders relating to the command of the orientation of said nose wheel; device for automatically determining, on the basis of said command orders, braking orders for a brake assembly of the aircraft, which comprises braking device of at least one left main landing gear and braking device of at least one right main landing gear and which is capable of generating a lateral movement of the aircraft about a vertical axis with an asymmetrical action, said braking orders being determined in such a way as to generate on the aircraft, when they are applied to the brake assembly, a lateral movement which is substantially identical to the lateral movement which would have been generated by the application of said command orders to said nose wheel; and a device for automatically applying said braking orders to said brake assembly, and is remarkable in that it additionally includes: device for automatically verifying, in the event of activation of the emergency automatic asymmetrical braking, whether conditions for turning of the aircraft are met; and device for automatically applying, if these conditions for turning of the aircraft are met and so long as they are, a braking value, known as a symmetrical braking value, at the level of the brake assembly, then for automatically distributing, in the course of the turn, this symmetrical braking value in differential braking between the braking device of the left main landing gear and the braking device of the right main landing gear, as a function of current directional command orders, in such a way as to maintain a constant overall braking level, at least for directional command orders below a predetermined threshold.

Aircraft, in particular a transport aeroplane, is also provided that is equipped with a lateral control device such as that mentioned above.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
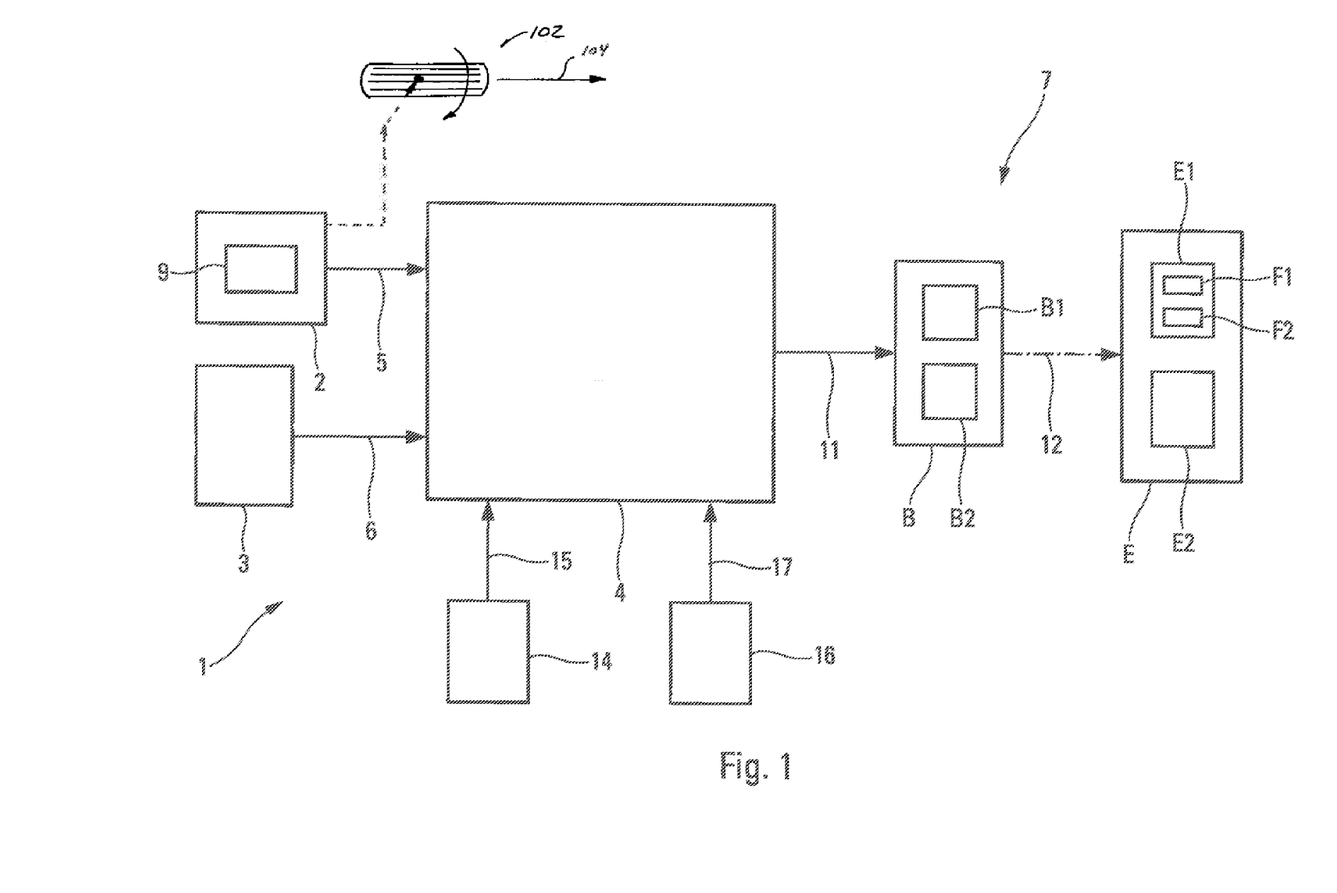
FIG. 1 shows a block diagram of a device which illustrates one embodiment.

The device 1 according to an embodiment and represented schematically in FIG. 1 is intended for the lateral control of an aircraft, not shown, which is in particular taxiing at an airport. This aircraft may in particular be a civil or military aeroplane for transporting passengers or cargo (freight), or a drone.

In the usual manner, said device 1 includes, as shown in FIG. 1: a generating device 2 for generating command orders relating to the command of the orientation of the nose wheel (102) of the aircraft. Said generating device 2 include control elements 9, in particular a handwheel, which enable a pilot of the aircraft to manually generate command orders relating to the orientation 104 of the nose wheel of said aircraft; an assembly 3 of sources of information, which includes in particular a device for measuring the current ground speed of the aircraft in the usual manner; a calculation unit 4 which is connected via connections 5 and 6 respectively to said generating device 2 and to said assembly 3. This calculation unit 4 is formed in such a way as to determine automatically, on the basis of said command orders and said current ground speed, braking orders for a brake assembly E1 of the aircraft, forming part of a command assembly E. This brake assembly E1 comprises usual braking device F1 of at least one left main landing gear and usual braking device F2 of at least one right main landing gear and is capable of generating a lateral movement of the aircraft about a vertical axis with a differential or asymmetrical braking (with respect to the longitudinal plane of symmetry of the aircraft). In the event of breakdown of the nose wheel orientation system, said braking orders are predetermined by the calculation unit 4 in such a way as to generate on the aircraft (when they are applied to the brake assembly E1) a lateral movement which is substantially identical to the lateral movement which would have been generated (in the usual manner) by the application of said command orders to said orientation system; and an application device 7 for automatically applying said braking orders to said brake assembly E1, so that they generate an asymmetrical action on the aircraft in order to obtain a lateral movement of the latter. Said application device 7 comprises, in addition to said brake assembly E1, an assembly B1 for activation of said assembly E1. Said assembly B1 (which forms part of an assembly B) receives said braking orders of said calculation unit 4 with a connection 11 and applies them to said assembly E, as illustrated with a connection 12 shown by dash-dot lines in FIG. 1.

Figure 2:
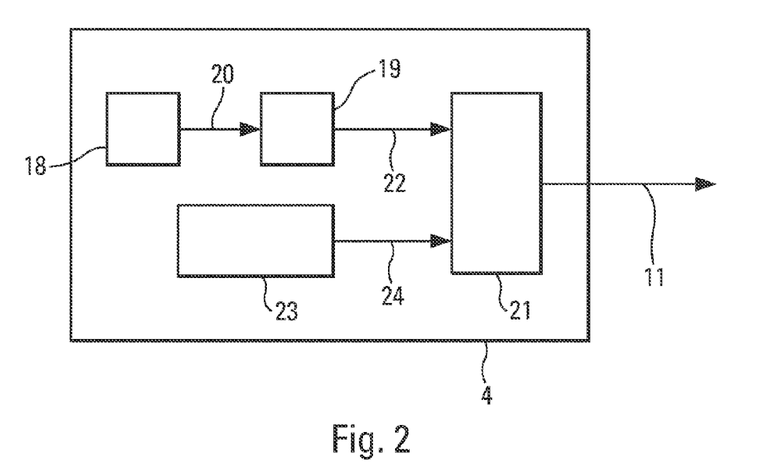
FIG. 2 and FIG. 3 are block diagrams of embodiments of calculation units of the device according to FIG. 1.

Furthermore, said calculation unit 4 includes, as shown in FIG. 2: a calculating device 18 for calculating, in the usual manner, an orientation angle of the nose wheel which is representative of the command orders (generated by said generating device 2). This orientation angle is generally that which is usually sent to the actuator which orients the nose wheel when this latter functions correctly; device 19 which are connected with a connection 20 to said calculating device 18 and are formed in such a way as to calculate a commanded pressure, in the usual manner, on the basis of at least the orientation angle received from the calculating device 18 and of the measured current ground speed; and device 21 which are connected with a connection 22 to said device 19 and which are formed in such a way as to determine pressure orders (left and right) which must be applied respectively to the brakes acting on the left side (that is to say to the braking device F1 of the left main landing gear) and to the brakes acting on the right side of the aircraft (that is to say to the braking device F2 of the right main landing gear).

The document FR-2 929 019 discloses a possible method for calculating said commanded pressure, with the aid of a prior calculation of the current curvature of a trajectory (of the aircraft) such as it would be if said nose wheel was oriented according to the orientation angle. The device 19 can implement this last method or also another usual method in order to determine the commanded pressure.

The device 1 therefore makes it possible to control the aircraft on the ground according to the lateral axis in the event of loss of control of the nose wheel, by applying a differential (or asymmetrical) braking in order to generate a yawing moment, in response to a control command on the usual steering control elements. To this end this device 1 comprises the aforementioned device which implement an emergency BSF function ("backup steering function") for directional control, which is such that the behaviour of the aircraft is as close as possible to that obtained in normal conditions, when the system of orientation of the nose wheel is available.

The device 1 also includes, as shown in FIG. 1: command device 14 for braking, in this case brake pedals, which are connected with a connection 15 to the calculation unit 4; and command device 16 for thrust, in this case thrust levers, which are connected with a connection 17 to the calculation unit 4.

In order to minimise the lateral/longitudinal coupling (namely to minimise the variations in speed of the aircraft) when asymmetrical braking (BSF function) is carried out by the device 1 in order to control the yawing moment of the aircraft in the event of breakdown of the nose wheel orientation system, said device 1 also includes, according to an embodiment, a calculation unit 23 which is integrated into the calculation unit 4 and which is connected by a connection 24 to the device 21 (FIG. 2).

Figure 3:
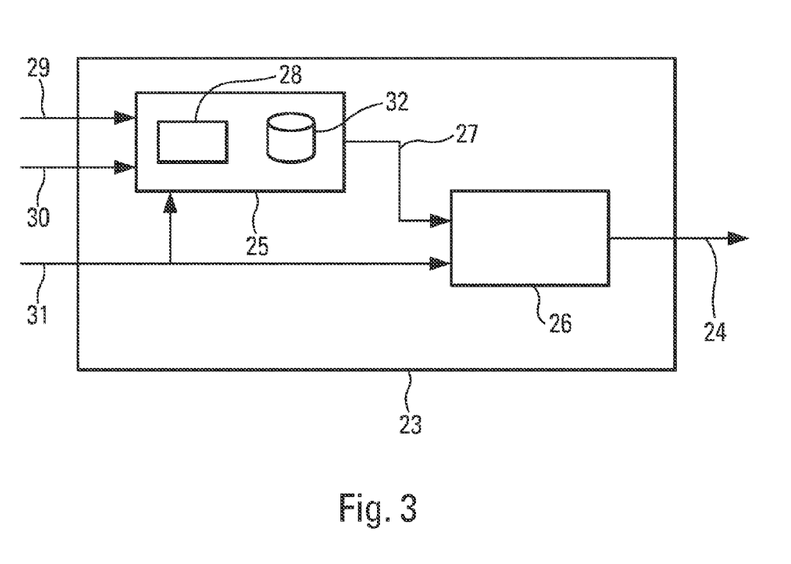

Said calculation unit 23 includes, as shown in FIG. 3, a device 25 for automatically verifying, in the event of activation of the automatic asymmetrical braking (BSF function), whether conditions for turning of the aircraft are met, and for transmitting a braking value, known as a symmetrical braking value, if these conditions for turning of the aircraft are met. Calculation unit 23 further includes a device 26 connected with a connection 27 to said device 25. Devices 25 and 26 are formed in such a way that, if the conditions for turning of the aircraft are met and so long as they are, devices 25 and 26 automatically apply said symmetrical braking value, known as a symmetrical braking value, at the level of said brake assembly E1. Devices 25 and 26 then, in the course of the turn, automatically distribute this symmetrical braking value in differential braking between the braking device F1 of the left main landing gear and the braking device F2 of the right main landing gear. This distribution is carried out, as specified below, as a function of current directional command orders, in such a way as to maintain a constant overall braking level, at least for directional command orders below a predetermined threshold.

The device 1 can be implemented on any type of brakes (or of braking device), and in particular on electrical brakes, to which said braking orders are applied. In an embodiment described below, it is implemented on usual brakes to which pressure is applied. Thus the calculation unit 23 which implements a function known as BPO ("brake pressure offset") generates the symmetrical braking value in the form of a pressure value, known as a symmetrical pressure Ps. This symmetrical pressure Ps is combined with a commanded pressure value, known as a commanded pressure Pc, which is representative of the directional command orders, in order to form a high pressure Ph and a low pressure Ps, of which one is intended for the braking device F1 of the left landing gear and of which the other is intended for the braking device F2 of the right landing gear, as a function of the direction relative to said directional command orders.

The symmetrical (braking) pressure to be applied is zero if the conditions of use of the BPO function are not met. Thus, by the distribution during a turn of the symmetrical braking value representing a braking reserve, with the aid of the calculation unit 23, the device 1 makes it possible to maintain a constant overall braking level, that is to say a constant speed of the aircraft, during the activation of the automatic asymmetrical braking (BSF function), at least for directional command orders below a predetermined threshold.

More precisely, when the pilot commands directional orders with the aid of his control elements 9, part of the braking reserve (calculated as a function of the order commanded) is released on one side (of the brake assembly) in order to be added on the other side. For small orders from the pilot, this distribution makes it possible to maintain the same overall level of braking and thus not to affect the speed of the aircraft.

The application of this braking reserve is virtually transparent for the pilot, since this will be effective solely after the turning, whilst the pilot will already be in the process of compensating for a differential braking peak of the thrust. The distribution of the braking reserve then makes it possible, during the established turn, to minimise the overall braking variations, associated with the application of differential braking. This makes it possible to facilitate the control and to improve the convenience thereof, whilst limiting the risk of stopping during the turn.

Said device 25 comprise a verification unit 28 for automatically verifying, in the event of activation of the automatic asymmetrical braking (BSF function activated), whether the conditions for turning of the aircraft are met. In order to do this, this verification unit 28 receives: with a connection 29, the status of the BSF function; with a connection 30, the ground speed of the aircraft; and with a connection 31, a value representing a directional command order. This value representing the directional command order may correspond to the commanded pressure resulting from the BSF function or to the position of the handwheel, in particular.

This verification unit 28 comprises: a first comparison element for comparing the ground speed of the aircraft with a predetermined threshold; and a second comparison element for comparing said value representing a directional command order with a predetermined threshold value.

As a function in particular of these comparisons, the verification unit 28 considers that the conditions of turning are met when the following conditions are simultaneously met: the automatic asymmetrical braking (BSF function) is activated; the ground speed of the aircraft is lower than said predetermined threshold speed; and the directional command order is higher than said threshold value.

Thus, this activation of the BPO function depends upon the activation status of the BSF function, the control directional order (in order to limit the activation of the BPO function to the turning manoeuvre, as the aircraft is not considered to be turning if the control directional order is lower than a certain threshold) and the ground speed of the aircraft (in a straight line, starting from a certain speed, the BSF function can be made to command a differential braking in order to keep the aircraft in a straight line, whilst in this phase the maintenance of the BPO function is neither necessary nor required).

If all these conditions are combined, the symmetrical pressure Ps which is stored in a memory 32 is transmitted by the verification unit 28 to the device 26 via the connection 27. Said symmetrical pressure Ps depends upon the characteristics of the aircraft, and it is determined in advance such that the associated asymmetrical braking reserve (of value 2*Ps) covers, during an established turn, the resistive moment of the landing gears of the aircraft, as well as the orders of the pilot in order to adjust the trajectory.

In fact, if the symmetrical pressure Ps is too low, it is not sufficient to absorb the variations of the control order for turning, and the BPO function implemented by the device 1 is not sufficiently effective. Furthermore, if the symmetrical pressure Ps is too high, and the longitudinal impact of the BPO function is too great, the pilot should apply a strong thrust, which is not desired. The determination of an optimal symmetrical pressure Ps therefore results from a compromise between these two constraints. In addition, this symmetrical pressure Ps is applied with a progressive transition, in order that the activation of the symmetrical braking remains transparent for the pilot.

Generally the increase in pressure of the braking reserve is transparent, since it occurs at the onset of the turn where a considerable differential braking level is commanded in order to generate the yawing movement of the aircraft. The braking reserve is then entirely consumed and the braking is only applied to the gear at the inside of the turn. During the onset of the turn, the increase in pressure of the reserve therefore has no effect, and it is only when the turn is established and the differential braking level required in order to keep the aircraft in rotation is reduced that the pressure, instead of returning to zero or to a low value, falls back to the value of the braking reserve.

Moreover, when the previously met turning conditions are no longer met, the symmetrical pressure value is still maintained for a predetermined duration, then it is cancelled progressively and gently. The transition during the deactivation of the BPO function is therefore likewise progressive in order that the pilot should have the time to reduce the thrust before the braking is completely released. At the end of the turn, this leaves the pilot time to reduce the thrust before the braking has been completely released, and makes it possible to avoid maintaining the BSF function when the aircraft is in a straight line and does not necessitate any directional control (which makes it possible to minimise the wear on the brakes and their temperature, as well as the necessary thrust level in order to reaccelerate at the end of a turn).

This symmetrical pressure Ps provided by the verification unit 28 is combined by the device 26 with a commanded pressure value, known as a commanded pressure Pc. This commanded pressure Pc is representative of directional command orders, is predetermined in the usual manner, and is received via the connection 31. The device 26 produces this combination in order to form a high pressure Ph and a low pressure Pb, of which one is intended to be applied to the braking device F1 of the left landing gear and of which the other is intended to be applied to the braking device F2 of the right landing gear, as a function of the direction relative to said directional command orders. The high pressure Ph and the low pressure Pb, predetermined by the device 26, are then transmitted by the connection 24 to the device 21. These devices 26 therefore make it possible to integrate the symmetrical braking value Ps with the commanded differential braking Pc and to define two high and low pressures, Ph and Pb respectively.

Figure 4A:
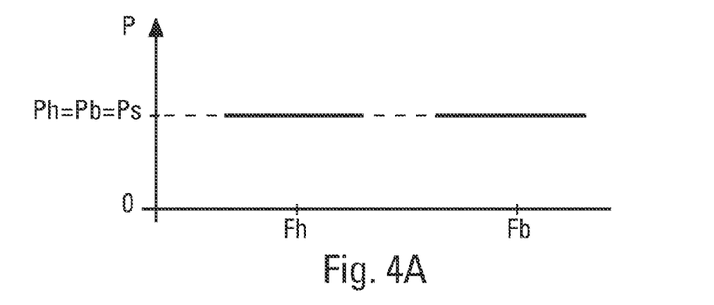
FIG. 4A to 4D are graphs which illustrate respectively different possibilities for distribution of a braking reserve.
Figure 4B:
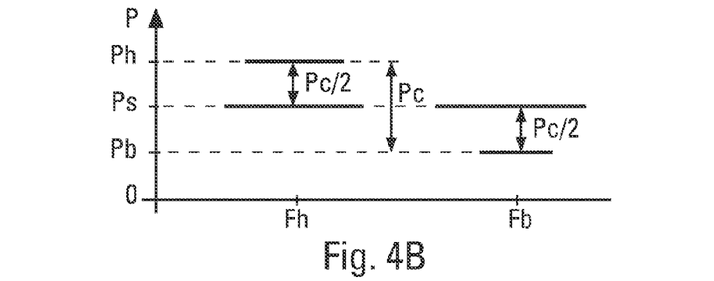
Figure 4C:
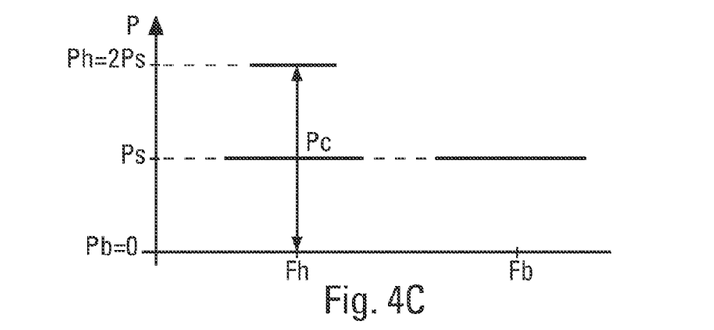
Figure 4D:
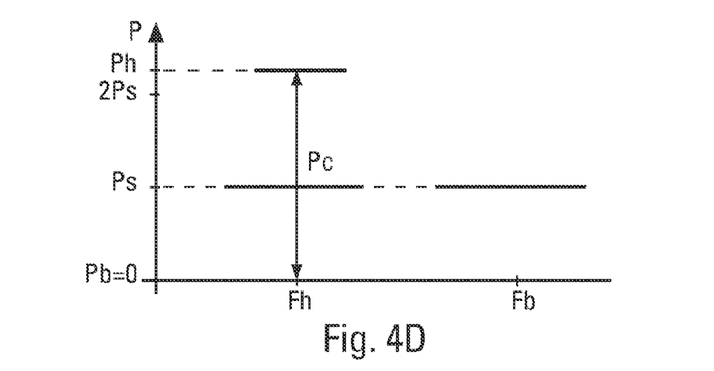

FIG. 4A to FIG. 4D illustrate on a pressure axis P, the pressures Ph and Pb which depend upon Pc and Ps and which are intended for braking device Fh and Fb, of which one corresponds to F1 and the other corresponds to F2 as a function of the direction of the turn. The logic implemented by the device 26 is as follows: if the symmetrical pressure Ps is not equal to zero and the commanded pressure Pc is zero, that is to say if the BSF function no longer commands the differential braking but the symmetrical braking (BPO function) is not yet released, then Ph=Pb=Ps (FIG. 4A); if the two pressures Ps and Pc are not equal to zero and Pc<2*Ps, that is to say if the pressure commanded by BSF is less than the sum of the symmetrical pressures available on the two sides, then Ph=Ps+Pc/2 and Pb=Ps−Pc/2 (FIG. 4B). Thus the symmetrical braking value is used as a differential braking reserve, in such a way as to maintain a constant overall braking level in the region of the aircraft, whilst generating the differential braking. This mode of operation is valid if the commanded pressures are small (small pilot orders); and if the two pressures Ps and Pc are not equal to zero and Pc≥2*Ps, that is to say if the differential pressure commanded by BSF is greater than the symmetrical braking value, then Ph=Pc and Pb=0. FIG. 4C illustrates the situation where Pc=2*Ps and FIG. 4D illustrates the situation where Pc>2*Ps.

Thus, in the case of important directional orders from the pilot, the symmetrical braking reserve is totally transformed into asymmetrical braking, and additional asymmetrical braking is applied as required. In this case, the BPO function makes it possible to decrease the impact of the differential braking on the overall braking of the aircraft, even if it does not cancel it out completely.

The device 21 which receive these values Ph and Pb determine the pressures to be transmitted to the assembly B1. The device 1 therefore makes it possible to facilitate the control, in the event of breakdown of the nose wheel orientation system and activation of a BSF function, by minimising the longitudinal impact (braking) of the BSF function by the application of a symmetrical braking value upstream of the commanded differential braking by the function during the turn.

Moreover, in an embodiment, said symmetrical braking value, representing an asymmetrical braking reserve, is combined with a reserve of thrust. In this particular embodiment, this thrust reserve is applied automatically to the engines of the aircraft, that is to say to an assembly of engines E2 forming part of the assembly E, by usual activation device B2 (forming part of the assembly B). This thrust reserve is applied, during turning of the aircraft, by which a distribution which is similar to the symmetrical braking value distribution (relative to the braking reserve) on the brake assembly. This makes it possible to create a doubling of the capacity for generation of a yawing movement of the aircraft with a beneficial impact on the temperature and the fuel consumption. It will be noted that said thrust reserve may be applied to any usual mode of propulsion of the aircraft.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method of lateral control of an aircraft, said aircraft equipped with an orientable nose wheel provided with an orientation system, wherein, in event of a breakdown of the orientation system, said method implementing an emergency automatic asymmetrical braking, comprising:
   receiving directional command orders relating to a command of an orientation of said nose wheel;
   automatically determining braking orders for a brake assembly of the aircraft on a basis of said directional command orders, wherein the brake assembly comprises a first braking device for at least one left main landing gear and a second braking device for at least one right main landing gear and which is capable of generating a lateral movement of the aircraft about a vertical axis with an asymmetrical action,
   wherein said braking orders are determined to generate a lateral movement on the aircraft which is substantially identical to the lateral movement which would have been generated by an application of said directional command orders to said nose wheel when they are applied to the brake assembly; and
   automatically applying said braking orders to said brake assembly,
   wherein the method also comprises:
   automatically determining braking orders for the brake assembly of the aircraft on the basis of said directional command orders comprises automatically verifying whether conditions for turning the aircraft are met in the event of activation of the emergency automatic asymmetrical braking; and
   if the conditions for turning the aircraft are met and for as long as the conditions are met:
     automatically applying a symmetrical braking value at said brake assembly; and
     automatically distributing the symmetrical braking value in differential braking between the first braking device of the left main landing gear and the second braking device of the right main landing gear as a function of current directional command orders, in such a way as to maintain a constant overall braking level, at least for directional command orders below a predetermined threshold;

wherein the symmetrical braking value is generated in the form of a symmetrical pressure (Ps);

wherein said symmetrical pressure (Ps) is combined with a commanded pressure (Pc), which is representative of said directional command orders, in order to form a high pressure (Ph) and a low pressure (Pb), of which one of the Ph or Pb is applied to the first braking device of the left landing gear and of which the other is applied to the second braking device of the right landing gear, as a function of the direction relative to said directional command orders; and wherein Ps and Pc are combined such that, if Pc is greater or equal to twice Ps, then Ph is set equal to Pc and Pb is set equal to zero; and if Pc is less than twice Ps, then Ph is set equal to the sum of Ps and half of Pc and Pb is set equal to the difference between Ps and half of Pc.

2. The method according to claim 1, wherein said symmetrical pressure (Ps) depends upon characteristics of the aircraft and is defined such that an associated asymmetrical braking reserve covers, while turning the aircraft, the resistive moment of landing gears of the aircraft, as well as orders below the predetermined threshold.

3. The method according to claim 1, wherein the high pressure (Ph) and the low pressure (Pb) are calculated on the basis of the symmetrical pressure (Ps) and of the commanded pressure (Pc), with aid of the following expressions:

if $Pc=0, Ph=Pb=Ps;$ if $Pc<2*Ps, Ph=Ps+Pc/2$ and $Pb=Ps-Pc/2;$ and if $Pc \geq 2*Ps, Ph=Pc$ and $Pb=0.$ 4. The method according to claim 1, wherein the conditions for turning the aircraft are met when the following conditions are simultaneously met:
the emergency automatic asymmetrical braking is activated;
a ground speed of the aircraft is lower than a predetermined speed; and
a directional command order of said directional command orders is higher than a selected threshold value.

5. The method according to claim 1, wherein, when the conditions for turning the aircraft are met, the symmetrical braking value is applied progressively over a predetermined length of time.

6. The method according to claim 1, wherein, when the conditions for turning the aircraft are no longer met, and the symmetrical braking value continues to be applied for a predetermined duration, then the symmetrical braking is progressively cancelled over a predetermined length of time.

7. The method according to claim 1, wherein said symmetrical braking value, representing an asymmetrical braking reserve, is combined with a thrust reserve, and said thrust reserve is applied to a mode of propulsion of the aircraft during turning of said aircraft.

8. A device for lateral control of an aircraft, said aircraft equipped with an orientable nose wheel provided with an orientation system, wherein said device includes, at least in order to implement emergency automatic asymmetrical braking in the event of breakdown of the orientation system:
a receiving device that is configured to receive directional command orders relating to a command of the orientation of said nose wheel;
a determining device that is configured to automatically determine, on a basis of said directional command orders, braking orders for a brake assembly of the aircraft, wherein the brake assembly comprises a first braking device for at least one left main landing gear and second braking device for at least one right main landing gear and which is capable of generating a lateral movement of the aircraft about a vertical axis with an asymmetrical action, said braking orders determined in such a way as to generate on the aircraft, when the braking orders are applied to the brake assembly, a lateral movement which is substantially identical to the lateral movement which would have been generated by an application of said directional command orders to said nose wheel; and
a first application device that is configured to automatically apply said braking orders to said brake assembly,
wherein said brake assembly further comprises a verification device that is configured to automatically verify, in the event of activation of the emergency automatic asymmetrical braking, whether conditions for turning the aircraft are met;
a second application device that is configured to automatically apply, if the conditions for turning the aircraft are met and for so long as the conditions are met, a symmetrical braking value at said brake assembly, then in the course of the turn automatically distributing this symmetrical braking value in differential braking between the first braking device of the left main landing gear and the second braking device of the right main landing gear, as a function of current directional command orders, in such a way as to maintain a constant overall braking level, at least for directional command orders below a predetermined threshold;
wherein the second application device is configured to generate the symmetrical braking value in the form of a symmetrical pressure (Ps);
wherein said symmetrical pressure (Ps) is combined with a commanded pressure (Pc), which is representative of said directional command orders, in order to form a high pressure (Ph) and a low pressure (Pb), of which one of the Ph or Pb is applied to the first braking device of the left landing gear and of which the other is applied to the second braking device of the right landing gear, as a function of the direction relative to said directional command orders; and
wherein Ps and Pc are combined such that, if Pc is greater or equal to twice Ps, then Ph is set equal to PC and Pb is set equal to zero; and if Pc is less than twice Ps, then Ph is set equal to the sum of Ps and half of Pc and Pb is set equal to the difference between Ps and half of Pc.

9. The device according to claim 8, wherein said symmetrical pressure (Ps) depends upon characteristics of the aircraft and is defined such that an associated asymmetrical braking reserve covers, while turning the aircraft, the resistive moment of the landing gears of the aircraft, as well as orders of a pilot below the predetermined threshold in order to adjust the trajectory.

10. The device according to claim 8, wherein the high pressure (Ph) and the low pressure (Pb) are calculated on the basis of the symmetrical pressure (Ps) and of the commanded pressure (Pc), with aid of the following expressions:

if $Pc=0, Ph=Pb=Ps;$ if $Pc<2*Ps, Ph=Ps+Pc/2$ and $Pb=Ps-Pc/2;$ and if $Pc \geq 2*Ps, Ph=Pc$ and $Pb=0.$ 11. The device according to claim 8, wherein the conditions for turning the aircraft are met when the following conditions are simultaneously met:
- the emergency automatic asymmetrical braking is activated;
- the ground speed of the aircraft is lower than a predetermined speed; and
- a directional command order of the directional command orders is higher than a selected threshold value.

12. The device according to claim 8, wherein, when the turning conditions are met, the symmetrical braking value is applied progressively over a predetermined time.

13. The device according to claim 8, wherein if the turning conditions have been met and are no longer met, and the symmetrical braking value continues to be applied for a predetermined duration, then the symmetrical braking is progressively cancelled over a predetermined length of time.

14. The device according to claim 8, wherein said symmetrical braking value, representing an asymmetrical braking reserve, is combined with a thrust reserve, and said thrust reserve is applied to a mode of propulsion of the aircraft during turning of said aircraft.

\* \* \* \* \*